United States Patent
Wang

(10) Patent No.: US 9,348,180 B2
(45) Date of Patent: May 24, 2016

(54) METHOD FOR FABRICATING LCD PANEL

(75) Inventor: Jun Wang, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 241 days.

(21) Appl. No.: 13/581,475

(22) PCT Filed: Jun. 8, 2012

(86) PCT No.: PCT/CN2012/076623
§ 371 (c)(1),
(2), (4) Date: Aug. 28, 2012

(87) PCT Pub. No.: WO2013/174042
PCT Pub. Date: Nov. 28, 2013

(65) Prior Publication Data
US 2014/0220847 A1    Aug. 7, 2014

(30) Foreign Application Priority Data
May 24, 2012    (CN) .......................... 2012 1 0163191

(51) Int. Cl.
G02F 1/1333    (2006.01)
G02F 1/1337    (2006.01)
G02F 1/1335    (2006.01)

(52) U.S. Cl.
CPC ........ *G02F 1/133788* (2013.01); *G02F 1/1337* (2013.01); *G02F 1/133512* (2013.01)

(58) Field of Classification Search
CPC    G02F 1/1333; G02F 1/133512; G02F 1/1337
USPC .......................................... 349/110, 191, 123
See application file for complete search history.

(56) References Cited

U.S. PATENT DOCUMENTS

2004/0227881 A1*  11/2004  Okazaki et al. .............. 349/123
2005/0018115 A1*  1/2005   Liao et al. .................... 349/114
2009/0135362 A1*  5/2009   Ono et al. .................... 349/143

* cited by examiner

*Primary Examiner* — Paisley L Arendt
*Assistant Examiner* — Agnes Dobrowolski
(74) *Attorney, Agent, or Firm* — Mark M. Friedman

(57) ABSTRACT

The present invention relates to a method for fabricating an LCD panel. The method includes the steps of: (A) forming a black matrix layer on a color filter substrate; and (B) attaching the color filter substrate to a corresponding array substrate for forming a liquid crystal cell, and applying a voltage on the black matrix layer for liquid crystal molecules in the liquid crystal cell being arranged at a pretilt angle. The fabricating method of the present invention can realize photo alignments on multiple partitions without demand in shapes of the pixel electrodes.

14 Claims, 3 Drawing Sheets

METHOD FOR FABRICATING LCD PANEL

FIELD OF THE INVENTION

The present invention relates to a method for fabricating a display panel, and especially to a method for fabricating a polymer-stabilizing alignment LCD panel with a high transmittance of light.

BACKGROUND OF THE INVENTION

With the advance of display technology, in comparison with conventional cathode ray tube (CRT) displays, Liquid crystal displays (LCDs) have the advantages of compact size, light weight, and low radiation for occupying no room. At present, the LCDs have become a main product in display market, and are widely used in calculators, personal digital assistants, laptop computers, digital cameras, mobile phones and other kinds of electronic products.

Conventional LCD panels often adopt a multi-domain vertical alignment (MVA) design or a polymer stabilized alignment (PSA) design.

The LCD panel adopting the MVA design is shown in FIG. 1, FIG. 1 is a sectional view illustrating an LCD panel adopting the MVA design in the prior art. The LCD panel includes an upper substrate 11 (generally color filter substrate), a liquid crystal molecule layer 12, and a lower substrate 13 (generally array substrate), in which the liquid crystal molecule layer 12 is formed between the upper substrate 11 and the lower substrate 13. There is a common electrode 14 disposed between the liquid crystal molecule layer 12 and the upper substrate 11, and there is a pixel electrode 15 disposed between the liquid crystal molecule layer 12 and the lower substrate 13. Bumps 16 (can also be slits) which are used for controlling an alignment can be formed on the common electrode 14 and the pixel electrode 15, so that the liquid crystal molecules are in a state of a slight tilt along shapes of the bumps 16 under a situation without applying a voltage. That way, when the pixel electrode 15 is applied a voltage, the liquid crystal molecules twist toward a predetermined direction from the state of the slight tilt, thereby significantly reducing a response time of the panel and achieving an effect of widening a viewing angle. However, a design of the bumps 16 or slits results raising a lot of manufacturing cost, also the bumps 16 formed on the upper substrate 11 and the lower substrate 13 often obstruct part of light. Thus, an aperture rate of the pixels is decreases, resulting in a lower brightness of a picture of the LCD device.

The LCD panel adopting the PSA design is shown in FIG. 2, FIG. 2 is a sectional view illustrating an LCD panel adopting the PSA design in the prior art. The LCD panel also includes an upper substrate 21, a liquid crystal molecule layer 22, and a lower substrate 23, in which the liquid crystal molecule layer 22 is formed between the upper substrate 21 and the lower substrate 23. There is a common electrode 24 disposed between the liquid crystal molecule layer 22 and the upper substrate 21, and there is a pixel electrode 25 disposed between the liquid crystal molecule layer 22 and the lower substrate 23. Monomers that are used for a polymer stabilized alignment are blended into the liquid crystal molecule layer 22, and the pixel electrode 25 can be designed to have a predetermined shape. In processes of fabricating the LCD panel, an electric field is formed between the pixel electrode 25 and the common electrode 24 for the liquid crystal molecules of the liquid crystal molecule layer 22 occurring corresponding twists. Because of the shape of the pixel electrode 25, the liquid crystal molecules twist toward different orientations and angles, and the monomers in the liquid crystal molecule layer 22 are also arranged along arranged directions of the liquid crystal molecules. Subsequently, the monomers are polymerized to be high molecular polymers 26 by using a light energy (can be visible light or ultraviolet light) or thermopolymerization, in which the high molecular polymers 26 are tilted in the LCD panel.

The high molecular polymers 26 make the liquid crystal molecules have a pretilt angle by the polymer stabilized alignment technology. That is, the liquid crystal molecules are arranged tiltedly by the influence of the high molecular polymers 26 without the electric field driving, thereby realizing a photo alignment of the liquid crystal molecules. Accordingly, when the liquid crystal molecules are driven by the electric field, the liquid crystal molecules can be quickly twisted to suitable orientations, so as to reduce the response time of the LCD panel. Therefore, the bumps or slits are not necessary to be disposed in the LCD panel adopting the PSA design, thereby overcoming the defect of the LCD panel adopting the MVA design.

However, various photo alignments on multiple partitions of the LCD panel adopting the PSA design are realized mainly by designing the shapes of the pixel electrodes at present; that is, different shapes of the pixel electrodes correspond to different tilted angles of the liquid crystal molecules. Accordingly, demands for fabricating the pixel electrodes are higher. The designed structures are more unitary with a tendency toward increased sizes of the LCD panel. The problem of color shift on the wide viewing angles still can not be overcome.

Therefore, there is a significant need to provide a fabricating method of an LCD panel for solving the problems existing in the prior art.

SUMMARY OF THE INVENTION

An objective of the present invention is to provide a method for fabricating an LCD panel. A pretilt angle is made by applying a voltage on a black matrix (BM) layer located on a color filter substrate (i.e. CF substrate) to influence the liquid crystal molecules in the liquid crystal molecule layer according to the fabricating method. There is no demand in the shapes of the pixel electrodes in a photo-alignment process of the fabricating method, and the photo alignments on the multiple partitions can be performed at the same time. The problem of the color shift, which results from unitary structures on the multiple partitions of the conventional LCD panel, on the wide viewing angles is solved pretty well.

To achieve the foregoing objective, the technical solution of this invention is implemented as follows.

A method for fabricating an LCD panel related by the present invention includes the steps of:

(A) forming a black matrix layer on a color filter substrate; and (B) attaching the color filter substrate to a corresponding array substrate for forming a liquid crystal cell, and applying a voltage on the black matrix layer for liquid crystal molecules in the liquid crystal cell being arranged at a pretilt angle.

The black matrix layer includes a plurality of black matrix rows and a plurality of black matrix columns which intersect perpendicularly to each other, and includes an insulative layer disposed between the black matrix rows and the black matrix columns.

The liquid crystal molecules in the liquid crystal cell are arranged at the pretilt angle by applying a first voltage on the black matrix rows and applying a second voltage on the black matrix columns.

In the fabricating method of the present invention, the step A specifically includes: forming the black matrix columns, the insulative layer, and the black matrix rows sequentially on the color filter substrate.

In the fabricating method of the present invention, the first voltage includes at least two sub voltages which are respectively applied to different parts of the black matrix rows.

In the fabricating method of the present invention, the second voltage includes at least two sub voltages which are respectively applied to different parts of the black matrix columns.

In the fabricating method of the present invention, after the step (B), the method further includes the step of:

(C) performing a photo-alignment process for the liquid crystal molecules arranged at the pretilt angle by using an ultraviolet light.

In the fabricating method of the present invention, the step (C) includes: performing the photo-alignment process for a part of the liquid crystal molecules arranged at the pretilt angle by using the ultraviolet light through a photomask.

In the fabricating method of the present invention, alignment directions of the photo-alignment process at various partitions of the LCD panel can be determined by aperture shapes of the photomask and the voltage.

A method for fabricating an LCD panel related by the present invention includes the steps of: (A) forming a black matrix layer on a color filter substrate; and (B) attaching the color filter substrate to a corresponding array substrate for forming a liquid crystal cell, and applying a voltage on the black matrix layer for liquid crystal molecules in the liquid crystal cell being arranged at a pretilt angle.

In the fabricating method of the present invention, the black matrix layer includes a plurality of black matrix rows and a plurality of black matrix columns which intersect perpendicularly to each other.

In the fabricating method of the present invention, the black matrix layer further includes an insulative layer disposed between the black matrix rows and the black matrix columns.

In the fabricating method of the present invention, the step A specifically includes: forming the black matrix columns, the insulative layer, and the black matrix rows sequentially on the color filter substrate.

In the fabricating method of the present invention, the liquid crystal molecules in the liquid crystal cell are arranged at the pretilt angle by applying a first voltage on the black matrix rows and applying a second voltage on the black matrix columns.

In the fabricating method of the present invention, the first voltage includes at least two sub voltages which are respectively applied to different parts of the black matrix rows.

In the fabricating method of the present invention, the second voltage includes at least two sub voltages which are respectively applied to different parts of the black matrix columns.

In the fabricating method of the present invention, after the step (B), the method further includes the step of: (C) performing a photo-alignment process for the liquid crystal molecules arranged at the pretilt angle by using an ultraviolet light.

In the fabricating method of the present invention, the step (C) includes: performing the photo-alignment process for a part of the liquid crystal molecules arranged at the pretilt angle by using the ultraviolet light through a photomask.

In the fabricating method of the present invention, alignment directions of the photo-alignment process at various partitions of the LCD panel can be determined by aperture shapes of the photomask and the voltage.

In comparison with the conventional fabricating method, the pretilt angle is made by applying the voltage on the black matrix (BM) layer located on the color filter substrate (i.e. CF substrate) to influence the liquid crystal molecules in the liquid crystal molecule layer according to the fabricating method of the present invention. There is no demand in the shapes of the pixel electrodes in a photo-alignment process of the fabricating method, and the photo alignments on the multiple partitions can be performed at the same time. The problem of the color shift, which results from the unitary structures on the multiple partitions of the conventional LCD panel, on the wide viewing angles is solved pretty well.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Figure 1:
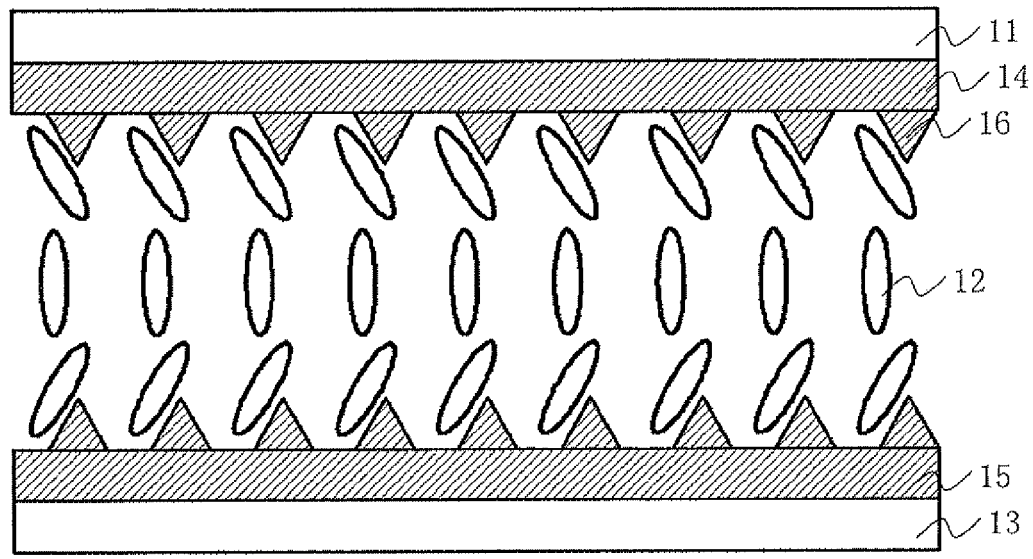
FIG. 1 is a sectional view illustrating an LCD panel adopting the MVA design in the prior art.
Figure 2:
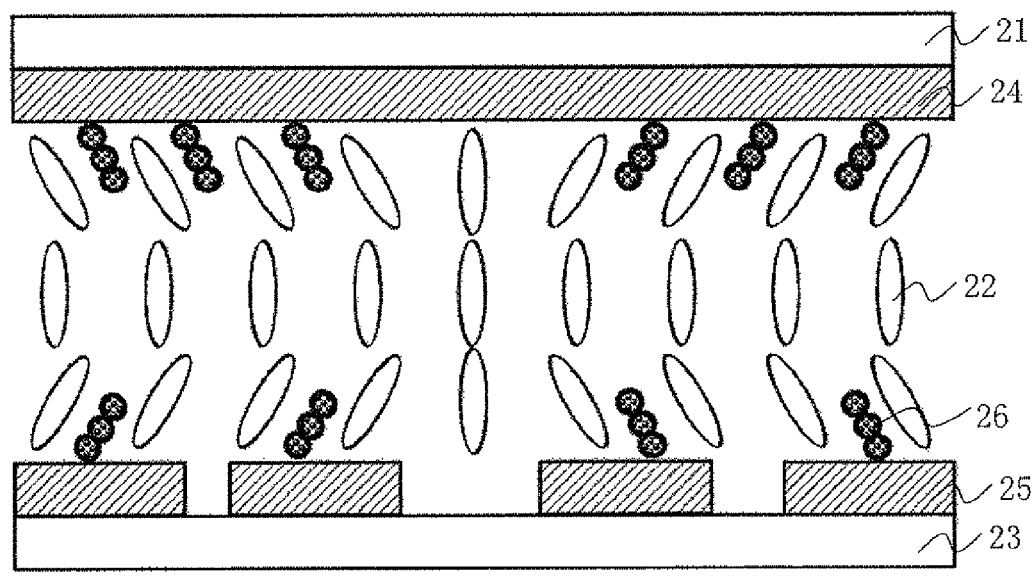
FIG. 2 is a sectional view illustrating an LCD panel adopting the PSA design in the prior art.

Descriptions of the following embodiments refer to attached drawings which are utilized to exemplify specific embodiments. Directional terms mentioned in the present invention, such as "top" and "down", "front", "rear", "left", "right", "inside", "outside", "side" and so on are only directions with respect to the attached drawings. Therefore, the used directional terms are utilized to explain and understand the present invention but not to limit the present invention.

In different drawings, the same reference numerals refer to like parts throughout the drawings.

Figure 3:
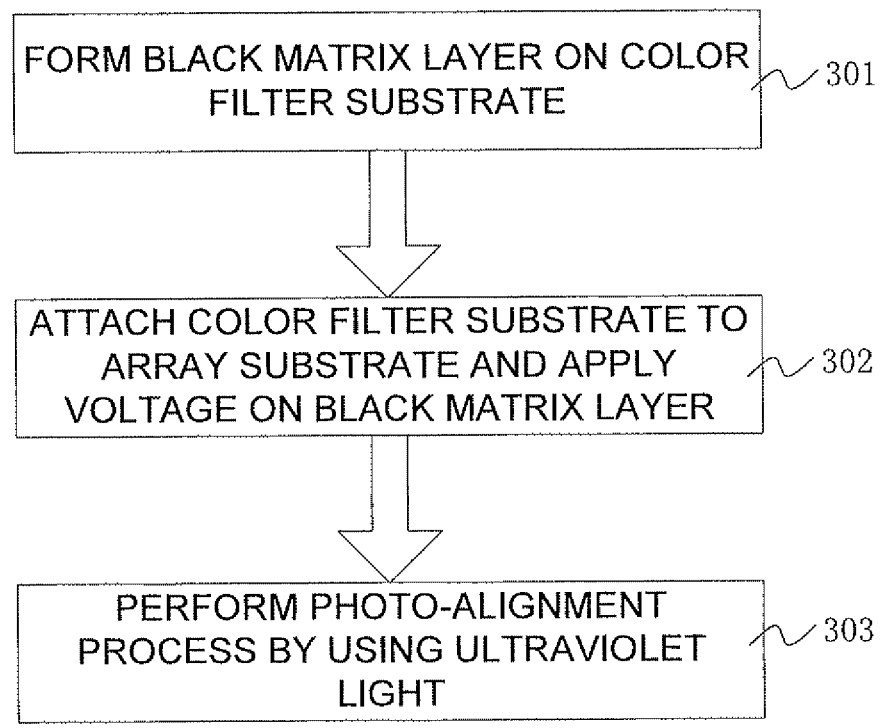
FIG. 3 is a flow chart illustrating a method for fabricating an LCD panel according to a preferred embodiment of the present invention.

Referring to FIG. 3, FIG. 3 is a flow chart illustrating a method for fabricating an LCD panel according to a preferred embodiment of the present invention. The fabricating method of the present invention includes the steps 301-303.

The step 301 is by forming a black matrix layer on a color filter substrate.

The step 302 is by attaching the color filter substrate to a corresponding array substrate for forming a liquid crystal cell, and applying a voltage on the black matrix layer for liquid crystal molecules in the liquid crystal cell being arranged at a pretilt angle.

The step 303 is by performing a photo-alignment process for the liquid crystal molecules arranged at the pretilt angle by using an ultraviolet light.

The method ends at the step 303.

Figure 4:
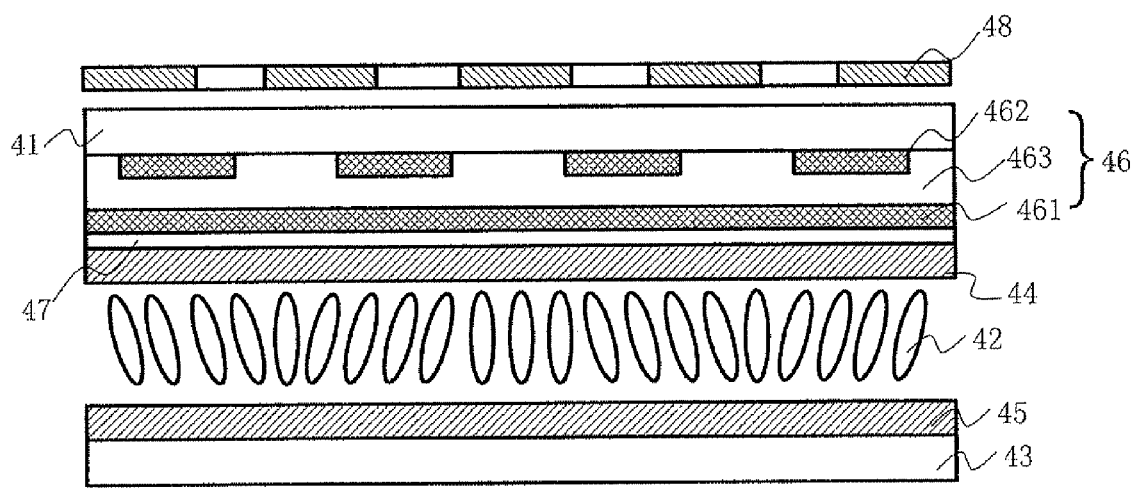
FIG. 4 is a schematic drawing illustrating the method for fabricating an LCD panel of the present invention.
Figure 5:
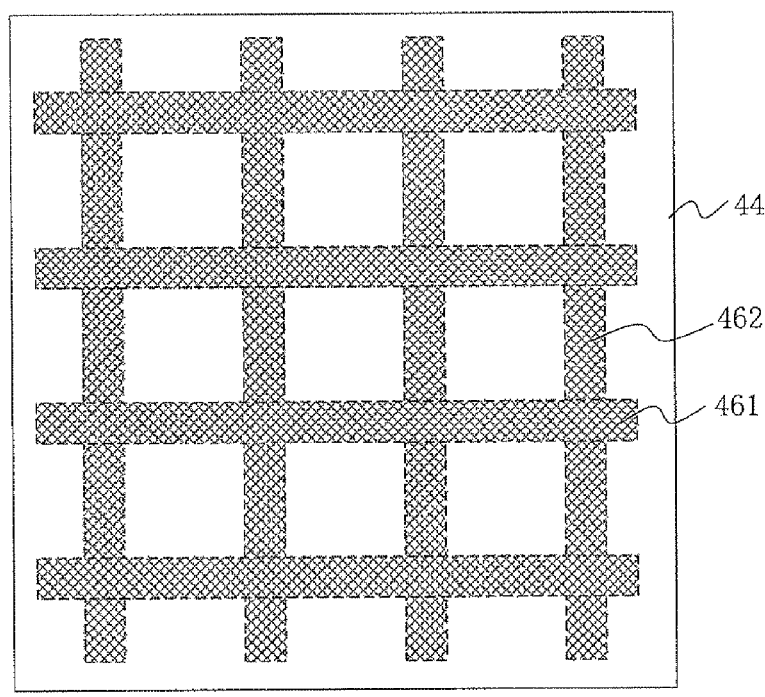
FIG. 5 is a top view illustrating a black matrix layer.

The fabricating method of the present invention will now be described in detail with reference to FIG. 4 and FIG. 5. FIG. 4 is a schematic drawing illustrating the method for fabricating an LCD panel of the present invention, and FIG. 5 is a top view illustrating a black matrix layer.

The LCD panel shown in FIG. 4 includes a color filter substrate 41, and a liquid crystal molecule layer 42, and an array substrate 43. The liquid crystal molecule layer 42 is formed between the color filter substrate 41 and the array substrate 43. There is a common electrode 44 disposed between the liquid crystal molecule layer 42 and the color filter substrate 41. There is a pixel electrode 45 disposed between the liquid crystal molecule layer 42 and the array substrate 43. The black matrix layer 46 is disposed between the color filter substrate 41 and the common electrode 44.

At the step 301, the black matrix layer 46 is formed on the color filter substrate 41. The black matrix layer 46 includes black matrix rows 461, black matrix columns 462, and an insulative layer 463 disposed 462 between the black matrix rows 461 and the black matrix columns 463. The black matrix rows 461 and the black matrix columns 463 intersect perpendicularly to each other, as shown in FIG. 5. The step specifically includes steps 3011-3013.

At step 3011, a black material layer (the black material layer consists of conductive material) is coated on the color filter substrate 41. Then the black material layer is processed by exposure through a corresponding photomask, development, clean, cure, and so on, so as to form the black matrix columns 462 on a surface of the color filter substrate 41.

At step 3012, the insulative layer 463 is deposited on the color filter substrate 41 where the black matrix columns 462 have been formed, and a surface of the insulative layer 463 is made to flatten.

At step 3013, another black material layer is coated on the color filter substrate 41 where the insulative layer 463 has been formed. Then the black material layer is processed by exposure through a corresponding photomask, development, clean, cure, and so on, so as to form the black matrix rows 461 which intersect perpendicularly to the black matrix columns on the surface of the insulative layer 463 The black matrix layer 46 consists of the black matrix columns 462, the insulative layer 463, and the black matrix rows on the color filter substrate 41.

Accordingly, the step 301 is completed.

Subsequently, at step 302, the step specifically includes steps 3021 and 3022.

At step 3021, the color filter substrate 41 where the black matrix layer 46 has been formed is attached to the corresponding array substrate 43 for forming the liquid crystal cell, as shown in FIG. 4. The pixel electrode 45 is disposed on the array substrate 43 herein. The common electrode 44 is disposed on the color filter substrate 41 where the black matrix layer 46 has been formed. A red, green, and blue (RGB) color resister (not shown) and the insulative layer 47 are disposed between the common electrode 44 and the black matrix layer 46. The common electrode 44 of the color filter substrate 41 faces the pixel electrode 45 of the array substrate 43 in the attachment, and the liquid crystals are filled between the common electrode 44 and the pixel electrode 45.

At step 3022, a voltage is applied on the black matrix layer 46 so that the liquid crystal molecules in the liquid crystal cell are arranged at the pretilt angle. Because the black matrix layer 46 includes the black matrix rows 461 and the black matrix columns 462, the voltage applied on each black matrix row 461 and each black matrix column 462 can be controlled respectively by a controller chip and so on. The liquid crystal molecules influenced by the black matrix rows 461 and the black matrix columns 462 can have various pretilt angles by applying different voltages on the black matrix rows 461 and the black matrix columns 462. For example, a voltage V1 (first voltage) can be applied on all the black matrix rows 461, and a voltage V2 (second voltage) can be applied on all the black matrix columns 462 at the same time, in which the first voltage is not equal to the second voltage. Besides, two sub voltages can also be applied on the black matrix rows 461 and the black matrix columns 462 respectively. For instance, a voltage V3 (third voltage) is applied on part of the black matrix rows 461, and a voltage V4 (fourth voltage) is applied on another part of the black matrix rows 461. A voltage V5 (fifth voltage) is applied on part of the black matrix columns 462, and a voltage V6 (sixth voltage) is applied on another part of the black matrix columns 462. The third voltage is not equal to the fourth voltage, and the fifth voltage is not equal to sixth voltage. Furthermore, more than two sub voltages can also be applied on the black matrix rows 461 (Certainly, the different sub voltages are respectively applied on the different black matrix rows), and the black matrix columns are applied in the same way. Therefore, how to apply the voltages on the black matrix rows 461 and the black matrix columns 462 and how much voltage do not limit the scope of the present invention. Whenever the liquid crystal molecules are arranged at a pretilt angle by applying voltages on the black matrix rows 461 and the black matrix columns 462, it belongs the scope of the present invention.

Subsequently, at step 303, the step specifically includes: exposing the liquid crystal molecules arranged at the pretilt angle by using the ultraviolet light through a photomask 48. the monomers, which are blended into the liquid crystal molecules, are polymerized to be the high molecular polymers (not shown), and the high molecular polymers 26 are tilted on the pixel electrode 45 and the common electrode 44, whereby the liquid crystal molecules are arranged at the pretilt angle. After the voltage applied on the black matrix layer 46 is removed, a part of the liquid crystal molecules which are not exposed return to a state of freedom without the pretilt angle. The pretilt angles of the liquid crystal molecules at various partitions of the LCD panel can be determined by aperture shapes of the photomask 48 and the voltages applied on the black matrix rows 461 and the black matrix columns 462, thereby determining photo-alignment directions at the various partitions.

Therefore, the photo-alignment directions at the various partitions are formed by applying the voltage on the black matrix layer located on the color filter substrate to influence the liquid crystal molecules in the liquid crystal molecule layer according to the fabricating method of the present invention, rather than fabricating the pixel electrode with various shapes to form the photo-alignment directions at the various partitions. Thus, the transmittance of light can be increased. Meanwhile, arbitrary pretilt angles of the liquid crystal molecules at various partitions with arbitrary shapes and each partition of the LCD panel can be determined by the aperture shapes of the photomask and the voltages applied on the black matrix rows and the black matrix columns. The problem of the color shift on the wide viewing angles is solved pretty well.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A Method for fabricating a liquid crystal display (LCD) panel, comprising the steps of:
   (A) forming a black matrix layer on a color filter substrate, wherein the black matrix layer comprises a plurality of black matrix rows and a plurality of black matrix columns which intersect perpendicularly to each other, and comprises an insulative layer disposed between the black matrix rows and the black matrix columns; and
   (B) attaching the color filter substrate to a corresponding array substrate for forming a liquid crystal cell, and applying a voltage on the black matrix layer for liquid crystal molecules in the liquid crystal cell being arranged at a pretilt angle;
   wherein the liquid crystal molecules in the liquid crystal cell are arranged at the pretilt angle by simultaneously applying a first voltage on the black matrix rows and applying a second voltage on the black matrix columns, and wherein the second voltage comprises at least two sub voltages which are respectively applied to different parts of the black matrix columns.

2. The method of claim 1, wherein the step A specifically comprises:
   forming the black matrix columns, the insulative layer, and the black matrix rows sequentially on the color filter substrate.

3. The method of claim 1 wherein the first voltage comprises at least two sub voltages which are respectively applied to different parts of the black matrix rows.

4. The method according to claim 3, wherein the second voltage comprises at least two sub voltages which are respectively applied to different parts of the black matrix columns.

5. The method of claim 1, wherein after the step (B), the method further comprises the step of:
   (C) performing a photo-alignment process for the liquid crystal molecules arranged at the pretilt angle by using an ultraviolet light.

6. The method according to claim 5, wherein
   the step (C) comprises: performing the photo-alignment process for a part of the liquid crystal molecules arranged at the pretilt angle by using the ultraviolet light through a photomask.

7. The method according to claim 6, wherein alignment directions of the photo-alignment process at various partitions of the LCD panel can be determined by aperture shapes of the photomask and the voltage.

8. A Method for fabricating a liquid crystal display (LCD) panel, comprising the steps of:
   (A) forming a black matrix layer on a color filter substrate, wherein the black matrix layer comprises a plurality of black matrix rows and a plurality of black matrix columns which intersect perpendicularly to each other; and
   (B) attaching the color filter substrate to a corresponding array substrate for forming a liquid crystal cell, and applying a voltage on the black matrix layer for liquid crystal molecules in the liquid crystal cell being arranged at a pretilt angle, wherein the liquid crystal molecules in the liquid crystal cell are arranged at the pretilt angle by simultaneously applying a first voltage on the black matrix rows and applying a second voltage on the black matrix columns, and wherein the second voltage comprises at least two sub voltages which are respectively applied to different parts of the black matrix columns.

9. The method of claim 8, wherein the black matrix layer further comprises an insulative layer disposed between the black matrix rows and the black matrix columns.

10. The method of claim 9, wherein the step A specifically comprises forming the black matrix columns, the insulative layer, and the black matrix rows sequentially on the color filter substrate.

11. The method of claim 8, wherein the first voltage comprises at least two sub voltages which are respectively applied to different parts of the black matrix rows.

12. The method of claim 8, wherein after the step (B), the method further comprises the step of:
   (C) performing a photo-alignment process for the liquid crystal molecules arranged at the pretilt angle by using an ultraviolet light.

13. The method of claim 12, wherein the step (C) comprises:
   performing the photo-alignment process for a part of the liquid crystal molecules arranged at the pretilt angle by using the ultraviolet light through a photomask.

14. The method of claim 13, wherein alignment directions of the photo-alignment process at various partitions of the LCD panel can be determined by aperture shapes of the photomask and the voltage.

* * * * *